(12) United States Patent
Kray et al.

(10) Patent No.: US 9,797,257 B2
(45) Date of Patent: Oct. 24, 2017

(54) ATTACHMENT OF COMPOSITE ARTICLE

(71) Applicant: General Electric Company, Schenectady, NY (US)

(72) Inventors: Nicholas Joseph Kray, Mason, OH (US); Scott Roger Finn, Montgomery, OH (US); Peggy Lynn Baehmann, Glenville, NY (US); Joel Primmer White, Milford, OH (US)

(73) Assignee: General Electric Company, Schenectady, NY (US)

( * ) Notice: Subject to any disclaimer, the term of this patent is extended or adjusted under 35 U.S.C. 154(b) by 957 days.

(21) Appl. No.: 13/709,651

(22) Filed: Dec. 10, 2012

(65) Prior Publication Data

US 2014/0161621 A1    Jun. 12, 2014

(51) Int. Cl.
*F01D 5/14*    (2006.01)
*F01D 5/28*    (2006.01)
(Continued)

(52) U.S. Cl.
CPC ............ *F01D 5/147* (2013.01); *B29C 70/202* (2013.01); *B29D 99/0025* (2013.01);
(Continued)

(58) Field of Classification Search
CPC . F01D 5/282; F01D 5/12; F01D 5/147; F03D 1/0675; Y10T 428/24017;
(Continued)

(56) References Cited

U.S. PATENT DOCUMENTS 3,628,890 A    12/1971  Sayre et al.
3,725,981 A     4/1973  Pinckney
(Continued)

FOREIGN PATENT DOCUMENTS

EP    2458153 A2    5/2012
FR    2195255 A5    3/1974
FR    2664941 A1    1/1992
GB     871066 A     6/1961
GB    2249592 A     5/1992

OTHER PUBLICATIONS

International Search Report and Written Opinion issued in connection with corresponding PCT Application No. PCT/US2013/073501 dated Oct. 8, 2014.

(Continued)

*Primary Examiner* — Richard Edgar
(74) *Attorney, Agent, or Firm* — General Electric Company; William Scott Andes

(57) ABSTRACT

A composite article including composite component mounted on a spar including a shank extending heightwise from below component base up into composite component. Tab at an upper end of shank substantially or fully embedded in the composite component and at least one ply surface pattern of the composite component contacting and generally conforming to at least one spar surface pattern on the tab.

Spar surface pattern may include spaced apart spar surface protrusions with spar surface spaces therebetween and spar surface protrusions extending outwardly from spar and disposed between tows in ply surface pattern. Tows may be layed up in spar surface spaces. Spar surface pattern may include continuous or segmented spaced spar surface protrusions and spar surface spaces therebetween with tows in ply surface pattern disposed in spar surface spaces. The composite article may be a composite blade or vane including a composite airfoil.

20 Claims, 9 Drawing Sheets

(51) Int. Cl.
  *B29D 99/00* (2010.01)
  *B29C 70/20* (2006.01)
  *B29C 70/38* (2006.01)
  *B29L 31/08* (2006.01)

(52) U.S. Cl.
  CPC .............. *F01D 5/282* (2013.01); *B29C 70/38* (2013.01); *B29L 2031/082* (2013.01); *Y02T 50/672* (2013.01)

(58) Field of Classification Search
  CPC ... B29C 70/202; B29C 70/38; B29D 99/0025; B29L 2031/082; Y02T 50/672
  See application file for complete search history.

(56) References Cited

U.S. PATENT DOCUMENTS

| | | |
|---|---|---|
| 3,737,250 A | 6/1973 | Pilpel et al. |
| 3,752,600 A | 8/1973 | Walsh et al. |
| 3,758,232 A | 9/1973 | Wallett |
| 3,778,185 A | 12/1973 | Plowman et al. |
| 3,799,701 A | 3/1974 | Rothman |
| 3,871,687 A | 3/1975 | Dockree |
| 3,883,267 A * | 5/1975 | Baudier ................ F01D 5/282 416/230 |
| 3,903,578 A | 9/1975 | Rothman |
| 3,923,422 A | 12/1975 | Ianniello et al. |
| 3,984,962 A | 10/1976 | Krohn |
| 4,037,990 A | 7/1977 | Harris |
| 4,070,127 A | 1/1978 | Loomis et al. |
| 4,071,184 A | 1/1978 | Carlson et al. |
| 4,110,056 A | 8/1978 | Stevenson |
| 4,142,554 A | 3/1979 | Washkewicz et al. |
| 4,171,999 A | 10/1979 | Allen |
| 4,185,472 A | 1/1980 | Yates et al. |
| 4,205,927 A | 6/1980 | Simmons |
| 4,211,589 A | 7/1980 | Fisher et al. |
| 4,213,641 A | 7/1980 | Bennett |
| 4,236,386 A | 12/1980 | Yates et al. |
| 4,238,540 A | 12/1980 | Yates et al. |
| 4,247,255 A | 1/1981 | De Rosa |
| 4,251,309 A | 2/1981 | Class et al. |
| 4,259,382 A | 3/1981 | Schwan |
| 4,279,275 A | 7/1981 | Stanwood et al. |
| 4,289,557 A | 9/1981 | Stanwood et al. |
| 4,307,755 A | 12/1981 | Schmidt et al. |
| 4,329,193 A | 5/1982 | Sznopek et al. |
| 4,339,230 A | 7/1982 | Hill |
| 4,362,418 A | 12/1982 | Loomis |
| 4,370,372 A | 1/1983 | Higgins et al. |
| 4,384,802 A | 5/1983 | Lo et al. |
| 4,385,644 A | 5/1983 | Kaempen |
| 4,433,933 A | 2/1984 | Parsons, Jr. et al. |
| 4,469,730 A | 9/1984 | Burhans |
| 4,508,047 A | 4/1985 | Bordat |
| 4,556,365 A | 12/1985 | Mouille et al. |
| 4,556,592 A | 12/1985 | Bannink, Jr. |
| 4,569,165 A | 2/1986 | Baker et al. |
| 4,570,979 A | 2/1986 | Moore |
| 4,579,475 A | 4/1986 | Hart-Smith et al. |
| 4,614,369 A | 9/1986 | Overath et al. |
| 4,619,470 A | 10/1986 | Overath et al. |
| 4,647,078 A | 3/1987 | Lundy |
| 4,648,800 A | 3/1987 | Fradenburgh et al. |
| 4,662,587 A | 5/1987 | Whitener |
| 4,681,647 A | 7/1987 | Kondo et al. |
| 4,701,231 A | 10/1987 | Peters et al. |
| 4,715,560 A | 12/1987 | Loyek |
| 4,722,717 A | 2/1988 | Salzman et al. |
| 4,740,100 A | 4/1988 | Saarela et al. |
| 4,747,806 A | 5/1988 | Krude et al. |
| 4,783,040 A | 11/1988 | Lindberg et al. |
| 4,784,575 A | 11/1988 | Nelson et al. |
| 4,797,064 A | 1/1989 | Ferris et al. |
| 4,810,167 A | 3/1989 | Spoltman et al. |
| 4,813,457 A | 3/1989 | Offringa et al. |
| 4,875,710 A | 10/1989 | Mercado |
| 4,877,376 A | 10/1989 | Sikorski et al. |
| 4,961,687 A | 10/1990 | Bost et al. |
| 4,966,527 A | 10/1990 | Merz |
| 4,974,245 A | 11/1990 | Mioque et al. |
| 5,009,628 A | 4/1991 | Rouillot |
| 5,015,116 A | 5/1991 | Nardone et al. |
| 5,041,318 A | 8/1991 | Hulls |
| 5,043,217 A | 8/1991 | Peters et al. |
| 5,067,875 A | 11/1991 | Hunter et al. |
| 5,076,601 A | 12/1991 | Duplessis |
| 5,082,314 A | 1/1992 | Aubry et al. |
| 5,106,130 A | 4/1992 | Ellsworth et al. |
| 5,110,260 A | 5/1992 | Byrnes et al. |
| 5,118,257 A * | 6/1992 | Blakeley ................ B64C 11/04 29/889.21 |
| 5,129,787 A | 7/1992 | Violette et al. |
| 5,167,742 A | 12/1992 | Peters |
| 5,213,379 A | 5/1993 | Taniguchi et al. |
| 5,269,489 A | 12/1993 | West et al. |
| 5,279,892 A | 1/1994 | Baldwin et al. |
| 5,281,454 A | 1/1994 | Hanson |
| 5,288,109 A | 2/1994 | Auberon et al. |
| 5,303,958 A | 4/1994 | Hyatt et al. |
| 5,314,282 A | 5/1994 | Murphy et al. |
| 5,314,382 A | 5/1994 | Pfeifer |
| 5,318,819 A | 6/1994 | Pai |
| 5,320,579 A | 6/1994 | Hoffmann |
| 5,327,963 A | 7/1994 | Vance, Sr. et al. |
| 5,338,611 A | 8/1994 | Lause et al. |
| 5,340,280 A * | 8/1994 | Schilling ................ F01D 5/282 416/219 R |
| 5,362,112 A | 11/1994 | Hamilton et al. |
| 5,375,978 A | 12/1994 | Evans et al. |
| 5,378,109 A | 1/1995 | Lallo et al. |
| 5,383,692 A | 1/1995 | Watts |
| 5,383,767 A | 1/1995 | Aubry |
| 5,398,975 A | 3/1995 | Simmons |
| 5,403,161 A | 4/1995 | Nealon et al. |
| 5,407,195 A | 4/1995 | Tiitola et al. |
| 5,429,853 A | 7/1995 | Darrieux |
| 5,431,456 A | 7/1995 | Okumura et al. |
| 5,443,099 A | 8/1995 | Chaussepied et al. |
| 5,458,465 A | 10/1995 | Von Wieser et al. |
| 5,460,416 A | 10/1995 | Freidrich et al. |
| 5,468,033 A | 11/1995 | Dohrmann et al. |
| 5,505,036 A | 4/1996 | Wiles |
| 5,520,422 A | 5/1996 | Friedrich et al. |
| 5,536,108 A | 7/1996 | Kvalheim |
| 5,542,230 A | 8/1996 | Schutze |
| 5,551,918 A | 9/1996 | Jones et al. |
| 5,556,565 A | 9/1996 | Kirkwood et al. |
| 5,560,730 A | 10/1996 | Gillard et al. |
| 5,591,084 A | 1/1997 | Poulin et al. |
| 5,632,601 A | 5/1997 | Bodmer et al. |
| 5,634,771 A * | 6/1997 | Howard ................ F01D 5/147 416/229 R |
| 5,685,576 A | 11/1997 | Wolfe et al. |
| 5,716,077 A | 2/1998 | Friedrich et al. |
| 5,725,434 A | 3/1998 | Haben et al. |
| 5,738,494 A | 4/1998 | Schmaling |
| 5,798,153 A | 8/1998 | Fay et al. |
| 5,800,128 A | 9/1998 | Bodmer et al. |
| 5,813,467 A | 9/1998 | Anderson et al. |
| 5,820,344 A | 10/1998 | Hamilton et al. |
| 5,824,179 A | 10/1998 | Greig |
| 5,836,825 A | 11/1998 | Yamane |
| 5,851,152 A | 12/1998 | Ilzhofer et al. |
| 5,866,272 A | 2/1999 | Westre et al. |
| 5,868,886 A | 2/1999 | Alston et al. |
| 5,895,079 A | 4/1999 | Carstensen et al. |
| 5,944,441 A | 8/1999 | Schuetze |
| 6,039,538 A | 3/2000 | Bansemir |
| 6,042,916 A | 3/2000 | Godbehere |
| 6,068,902 A | 5/2000 | Vasiliev et al. |
| 6,168,379 B1 | 1/2001 | Bauer |
| 6,176,681 B1 | 1/2001 | Stroemberg et al. |
| 6,190,263 B1 | 2/2001 | Kimoto et al. |

(56) References Cited

U.S. PATENT DOCUMENTS

| | | |
|---|---|---|
| 6,213,719 B1 | 4/2001 | Violette et al. |
| 6,305,905 B1 | 10/2001 | Nagle et al. |
| 6,431,837 B1 | 8/2002 | Velicki |
| 6,502,788 B2 | 1/2003 | Noda et al. |
| 6,735,866 B2 | 5/2004 | Nogueroles Vines et al. |
| 7,087,296 B2 | 8/2006 | Porter |
| 7,575,417 B2 | 8/2009 | Finn et al. |
| 8,075,274 B2 | 12/2011 | Carvalho |
| 2001/0050469 A1 | 12/2001 | Bernhardt |
| 2002/0008177 A1 | 1/2002 | Violette |
| 2003/0067167 A1 | 4/2003 | Massaria |
| 2003/0090108 A1 | 5/2003 | Palsson |
| 2003/0134090 A1 | 7/2003 | Tate |
| 2003/0205011 A1 | 11/2003 | Bequet |
| 2003/0230893 A1 | 12/2003 | Song et al. |
| 2004/0061024 A1 | 4/2004 | Arulf et al. |
| 2004/0062655 A1 | 4/2004 | Potter et al. |
| 2004/0213953 A1 | 10/2004 | Brantley et al. |
| 2005/0084379 A1 | 4/2005 | Schreiber |
| 2005/0121913 A1 | 6/2005 | Smahl |
| 2005/0257847 A1 | 11/2005 | Francesco et al. |
| 2006/0083907 A1 | 4/2006 | Bech et al. |
| 2006/0113706 A1 | 6/2006 | Chevin et al. |
| 2006/0258469 A1 | 11/2006 | Dewhirst et al. |
| 2007/0175966 A1 | 8/2007 | Barnes |
| 2008/0001396 A1 | 1/2008 | Nish et al. |
| 2008/0012329 A1 | 1/2008 | Dewhirst |
| 2008/0115454 A1 | 5/2008 | Xie |
| 2008/0228288 A1 | 9/2008 | Nelson et al. |
| 2008/0302914 A1 | 12/2008 | Wagner |
| 2009/0047100 A1 | 2/2009 | Keener |
| 2009/0087259 A1 | 4/2009 | Bettinger |
| 2009/0126180 A1 | 5/2009 | Keener |
| 2009/0148647 A1 | 6/2009 | Jones et al. |
| 2011/0129348 A1 | 6/2011 | Parkin et al. |

OTHER PUBLICATIONS

"Design of Composite-Material Plates for Maximum Uniaxial Compressive Buckling Load", by Timothy L. C. Chen and Charles W. Bert, Oaklahoma Academy of Science Proceedings, Sep. 25, 2012, 104-107.

PCT Search Report and Written Opinion issued in connection with related PCT Application No. PCT/US2013/073506 dated Feb. 20, 2014.

PCT Preliminary Report on Patentability issued in connection with related PCT Application No. PCT/US2013/073506 dated Jun. 25, 2015.

Unofficial English Translation of Chinese Office Action issued in connection with related CN Application No. 201380064678.X dated Jan. 21, 2016.

GE Related Case Form.

* cited by examiner though the ATTACHMENT OF COMPOSITE ARTICLE

BACKGROUND OF THE INVENTION

Field of the Invention

The invention relates to gas turbine engine composite airfoils and, particularly, for metallic attachments for composite airfoils for mounting in aircraft gas turbine engines.

Description of Related Art

Bypass gas turbine engines of the turbofan type generally includes a forward fan and booster compressor, a middle core engine, and an aft low pressure power turbine. A low pressure turbine rotatably drives the fan and booster compressor via a low pressure shaft, all of which form the low pressure rotor. Composite airfoils have been developed for and used in blades for rotatable stages of the booster compressor and in stator vanes disposed between and upstream and downstream of the blades as well in other sections of the engine such as in the fan section (fan outlet guide vanes).

It is known to manufacture aircraft gas turbine engine blade and vane airfoils from composite materials. It is difficult to attach the composite airfoils to a metallic attachment for mounting the blade or vane to a metallic rotor or stator portion of the engine. This is a challenge due to the magnitude of loads and limited size of the components. Typically, the attachments of these composite parts are the challenging part of that implementation. Typically, it is desired to have an integral composite/metallic system that takes advantage of the composite weight reduction and complex machining of a metallic interface. Joining these two systems in the past has been by simple adhesive bonds. These bonds are subject to forces and moments that tend to dislodge the composite airfoils from a metallic mount of the blade or vane.

It is highly desirable to provide mounts for securely and robustly mounting composite airfoils in both gas turbine engine rotor and fan frame assemblies that resist forces and moments that tend to dislodge the composite airfoils from a metallic mount of the blade or vane and that will enhance the life of the airfoils and the fan frame assembly. In a broader sense, it is highly desirable to provide mounts for securely and robustly mounting composite parts that resist forces and moments that tend to dislodge composite elements from metallic mounts on the part.

SUMMARY OF THE INVENTION

A composite article includes a composite component extending heightwise from a component base to a component tip and lengthwise between spaced apart component first and second edges. The composite component includes plies having widthwise spaced apart ply first and second sides and ply edges therebetween. The composite component is mounted on a spar including a shank extending heightwise from below the component base up through the component base into the composite component. A tab at an upper end of shank and substantially or fully embedded in the composite component includes a heightwise spaced apart tab base and tab tip. At least one ply surface pattern of the composite component contacts and generally conforms to at least one spar surface pattern on the tab.

The spar surface pattern may include spaced apart spar surface protrusions with spar surface spaces therebetween and the spar surface protrusions extending outwardly from the spar and disposed between tows in the ply surface pattern. The tows being layed up tows in the spar surface spaces.

The spar surface pattern may include spaced apart spar surface protrusions with spar surface spaces therebetween, tows in the ply surface pattern, ply surface recesses in between the tows in the ply surface pattern, and the tows disposed in the spar surface spaces and between the spar surface protrusions. The spar surface pattern may be corrugated or wavy, the spar surface spaces and the spar surface protrusions continuous, the spaced apart spar surface protrusions defining spar peaks, the spar surface spaces defining spar troughs, and the tows disposed in the spar troughs and between the spar peaks.

The spar surface pattern may include segmented spar surface spaces and spar surface protrusions may be segmented and include first and second rows of the segmented spar surface protrusions and the segmented spar surface spaces. The first rows of the segmented spar surface protrusions are angled with respect to the second rows of the segmented spar surface protrusions at a first angle, the first rows of the segmented spar surface spaces are angled with respect to the second rows of the segmented spar surface spaces at the first angle, and first and second groups of the tows are disposed in the first and second rows of the segmented spar surface spaces respectively. The first angle may be 90 degrees. The first rows of the segmented spar surface protrusions may be angled with respect to a tab or shank centerline of the spar.

A composite blade or vane includes a composite airfoil including widthwise spaced apart airfoil pressure and suction sides extending heightwise or spanwise and outwardly from an airfoil base to an airfoil tip and lengthwise or chordwise between spaced apart airfoil leading and trailing edges. The composite airfoil includes plies having widthwise spaced apart ply pressure and suction sides and ply edges therebetween and mounted on a spar including a shank extending heightwise from below the airfoil base up through the airfoil base into the composite airfoil. A tab at an upper end of shank is substantially or fully embedded in the composite airfoil and includes spanwise spaced apart tab base and tab tip. At least one ply surface pattern of the composite component contacts and generally conforms to at least one spar surface pattern on the tab.

The tab may include widthwise spaced apart tab pressure and suction sides extending outwardly from the tab base to the tab tip, the at least one spar surface pattern on the tab pressure and suction sides, and the at least one ply surface pattern of the composite component contacting and generally conforming to the at least one spar surface pattern on the tab pressure and suction sides.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
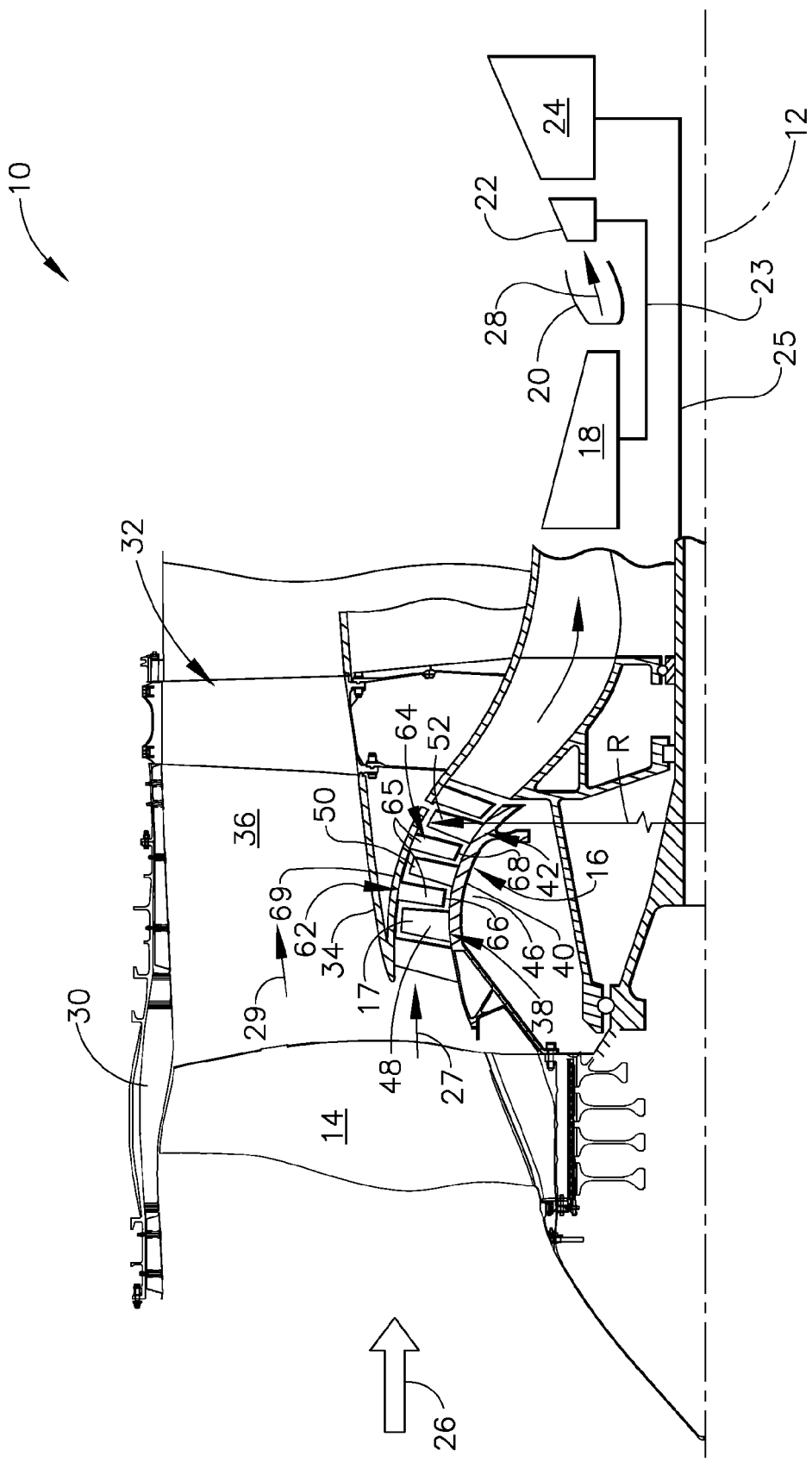
FIG. 1 is a longitudinal part sectional and part diagrammatical view illustration of an exemplary embodiment of an aircraft turbofan gas turbine engine having booster blades and vanes having composite airfoils.

Illustrated in FIG. 1 is an exemplary aircraft turbofan gas turbine engine 10 circumscribed about an engine centerline axis 12 and suitably designed to be mounted to a wing or fuselage of an aircraft. The engine 10 includes, in downstream serial flow communication, a fan 14, a booster or a low pressure compressor 16, a high pressure compressor 18, a combustor 20, a high pressure turbine (HPT) 22, and a low pressure turbine (LPT) 24. The HPT or high pressure turbine 22 is joined by a high pressure drive shaft 23 to the high pressure compressor 18. The LPT or low pressure turbine 24 is joined by a low pressure drive shaft 25 to both the fan 14 and booster or low pressure compressor 16.

In typical operation, air 26 is pressurized by the fan 14 and an inner portion of this air is channeled through the low pressure compressor 16 which further pressurizes the air. The pressurized air is then flowed to the high pressure compressor 18 which further pressurizes the air. The pressurized air is mixed with fuel in the combustor 20 for generating hot combustion gases 28 that flow downstream in turn through the HPT 22 and the LPT 24. Energy is extracted in the two turbines for powering the fan 14, low pressure compressor 16, and the high pressure compressor 18.

A flow splitter 34 surrounding the booster compressor 16 immediately behind the fan 14 includes a sharp leading edge which splits the fan air 26 pressurized by the fan 14 into a radially inner stream 27 channeled through the booster compressor 16 and a radially outer stream 29 channeled through the bypass duct 36.

A fan nacelle 30 surrounding the fan 14 is supported by an annular fan frame 32. The low pressure compressor 16 is suitably joined to the fan 14 forward of the fan frame 32, is disposed radially inboard of the annular flow splitter 34, and is spaced radially inwardly from an inner surface of the fan nacelle 30 to partially define an annular fan bypass duct 36 therebetween. The fan frame 32 supports the nacelle 30.

The compressor 16 has rotatable first, second, and third compressor stages 38, 40, 42 with first, second, and third compressor blade rows 48, 50, 52, respectively. Compressor blades 17 of the first, second, and third compressor blade rows 48, 50, 52 extend radially outwardly from a rotatable hub 46 connected to the fan 14. The compressor 16 has non-rotatable first and second vane stages 62, 64 with first and second vane rows 66, 68, respectively. Compressor vanes 65 of the first and second vane stages 62, 64 extend radially inwardly from a non-rotatable shell or outer band 69 or other annular structure fixedly connected to a forward or fan frame 32. The first, second, and third compressor blade rows 48, 50, 52 are interdigitated with the first and second vane rows 66, 68. The compressor blades and vanes 17, 65 may include composite airfoils. It is also known to mount compressor blades having composite airfoils to disks or drums of gas turbine engines.

Figure 3:
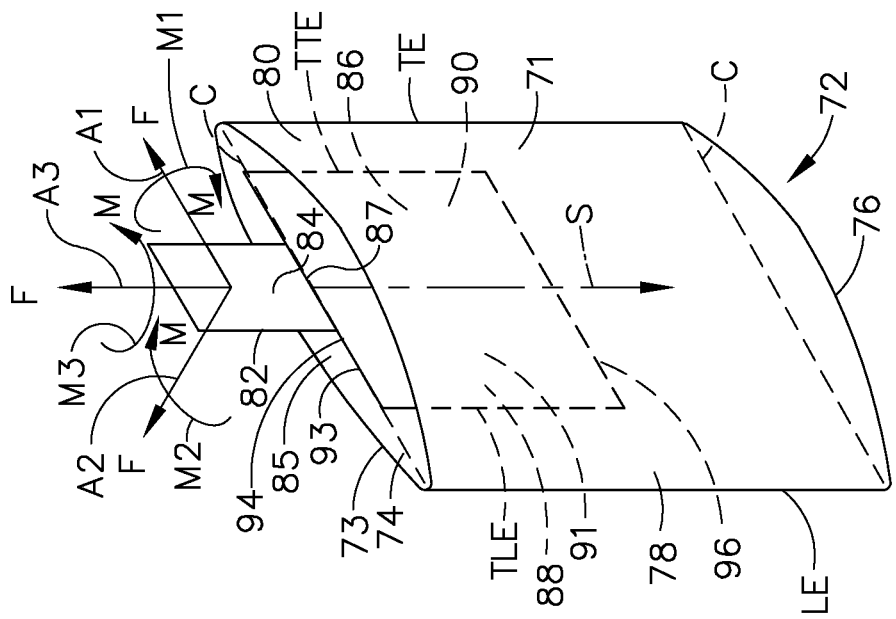
FIG. 3 is a diagrammatical perspective view illustration of a composite airfoil having a metallic shank with an enlarged tab inserted therein suitable for use with one of the booster blades and vanes illustrated in FIG. 1.
Figure 4:
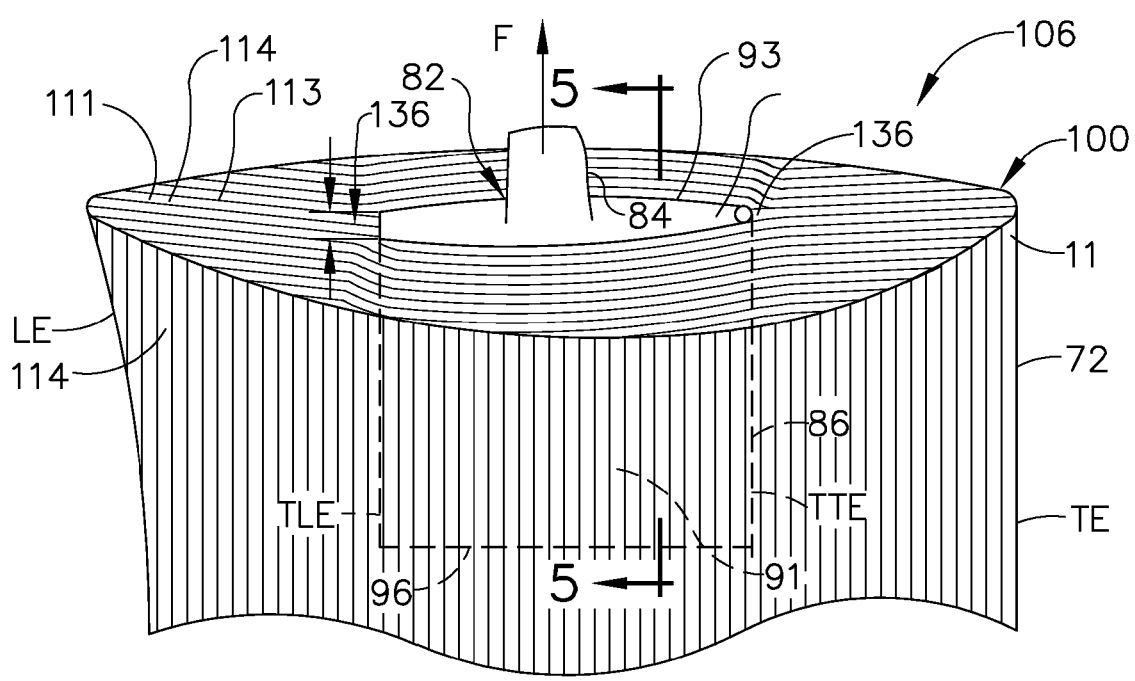
FIG. 4 is an enlarged diagrammatical perspective view illustration of the composite airfoil and the metallic shank illustrated in FIG. 3.
Figure 5:
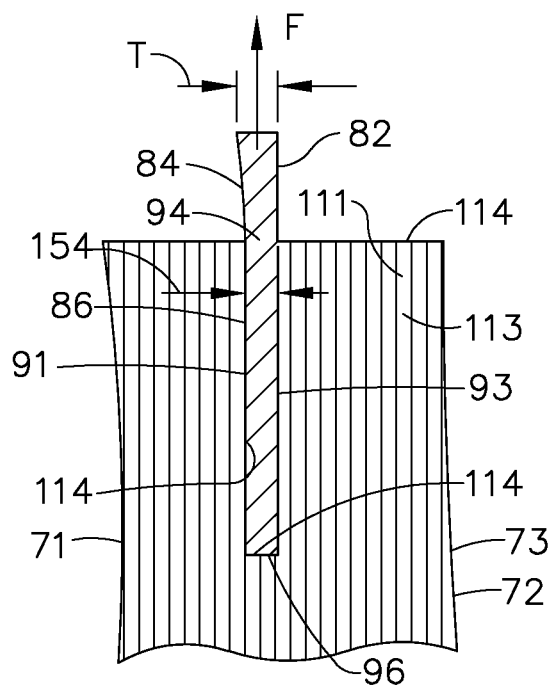
FIG. 5 is a diagrammatical cross sectional view illustration of the composite airfoil and the metallic shank through 5-5 in FIG. 4.

Illustrated in FIGS. 3-5 is a composite airfoil 72 that is designed for use in a gas turbine engine blade or vane exemplified by the compressor blades and vanes 17, 65 illustrated in FIG. 1 and described above. The composite airfoil 72 includes widthwise spaced apart airfoil pressure and suction sides 71, 73 extending heightwise or spanwise and outwardly from an airfoil base 74 along an airfoil span S to an airfoil tip 76. The exemplary airfoil pressure and suction sides 71, 73 illustrated herein may be concave and convex respectively. The composite airfoil 72 includes lengthwise or chordwise spaced apart airfoil leading and trailing edges LE, TE at or near forward and aft ends 78, 80 of the airfoil 72. A chord C is defined as a line between the airfoil leading and trailing edges LE, TE of an airfoil cross section 85 of the airfoil 72.

The composite airfoil 72 is mounted on a spar 82 including a shank 84 extending from below the airfoil base 74 up through the airfoil base 74 into the composite airfoil 72. The spar 82 may be made of a material substantially harder than that of the composite airfoil 72. The spar material may be metallic. The spar 82 includes a tab 86 at an upper end 87 of the shank 84. The tab 86 is either substantially or fully embedded in the composite airfoil 72 and may be substantially wider than the shank 84 in a generally chordal direction between the airfoil leading and trailing edges LE, TE.

Figure 6:
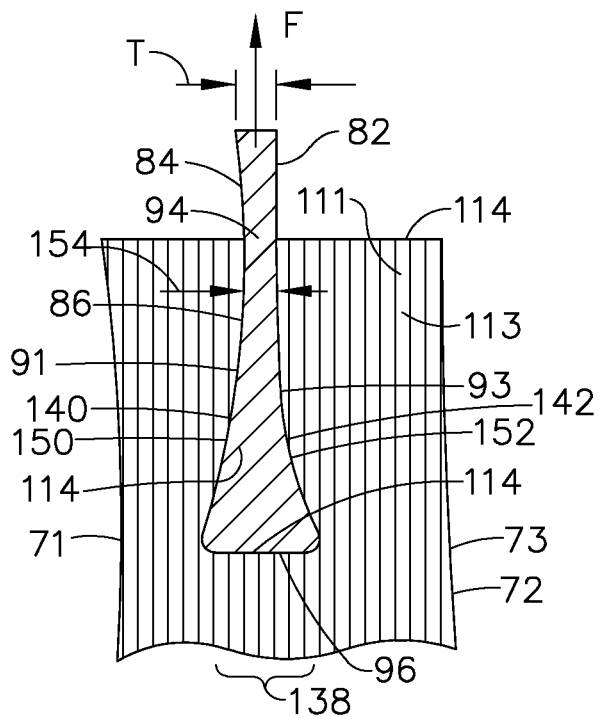
FIG. 6 is a diagrammatical cross sectional view illustration of an alternative to the metallic shank illustrated in FIG. 5.

The tab 86 includes widthwise spaced apart tab pressure and suction sides 91, 93 extending outwardly from a tab base 94 to a tab tip 96. The tab pressure and suction sides 91, 93 correspond to the airfoil pressure and suction sides 71, 73. The tab 86 illustrated in FIG. 5 has tab pressure and suction sides 91, 93 generally parallel to the airfoil pressure and suction sides 71, 73. The tab 86 illustrated in FIG. 6 is widthwise tapered and has curved tab pressure and suction sides 91, 93 which define a widthwise taper 154 therebetween having a narrowing widthwise thickness T. The exemplary embodiment of the taper 154 illustrated herein tapers down in thickness from the tab tip 96 towards the tab base 94.

The tab 86 includes widthwise spaced apart tab leading and trailing edges TLE, TTE at or near tab forward and aft ends 88, 90 of the tab 86. The exemplary embodiment of the tab 86 is fully embedded in the composite airfoil 72 and the tab base 94 (as illustrated herein) is flush with the airfoil base 74. The tab 86 may be embedded deeper into the composite airfoil 72 such that the tab base 94 is spaced inwardly of airfoil base 74.

The spar 82 and the tab 86 provide a means to mount the composite airfoil 72 on a rotor or static structure of the engine. The tab 86 is designed to resist forces F and moments M illustrated in FIG. 3 that tend to loosen and dislodge the composite airfoil 72 from the spar 82 and the tab 86. The forces F produce the moments M because the vane or blade containing the spar 82 is mounted cantilevered from the rotor or static structure of the engine. Forces F generally act along three orthogonal axis which are indicated herein as a lengthwise or axial first axis A1 which is generally parallel to the chord C between the airfoil leading and trailing edges LE, TE, a widthwise or circumferential second axis A2 which is generally tangential to a circumference defined by a radius R (illustrated in FIG. 1) normal to the engine centerline axis 12, and a heightwise or radial third axis A3 along the radius R. Moments M are indicated as first, second, and third moments M1, M2, M3 about the first, second, and third axes A1, A2, A3 respectively.

The composite airfoil 72 is made up of filament reinforced laminations 100 formed from a composite material lay-up 106 of filament reinforced composite plies 11. As used herein, the terms "lamination" and "ply" are synonymous. The plies 11 are generally all made from a unidirectional fiber filament ply woven material which may be in the form of a tape or sheet of material. The plies 11 essentially form the composite airfoil 72. Each of the filament reinforced laminations 100 or plies 11 have widthwise spaced apart ply pressure and suction sides 111, 113 and ply edges 114 therebetween. During manufacturing, the plies are layed up around and against the spar and tab and then molded and cured.

Referring to FIGS. 7-12, ply surface patterns 126 are designed to generally conform to spar surface patterns 128 and provide a mechanical lock between the two when the plies 11 are molded and cured around the spar 82 and tab 86.

Figure 7:
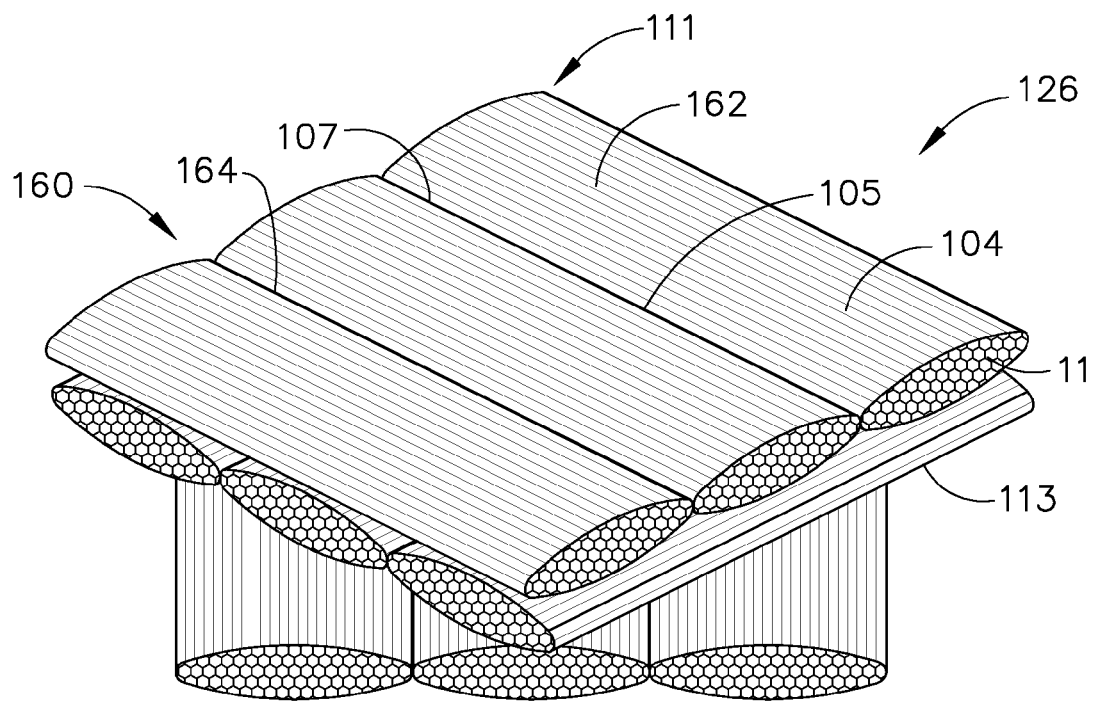
FIG. 7 is a diagrammatical perspective view illustration of a first surface pattern of a composite woven material suitable for the plies illustrated in FIGS. 4-6.
Figure 8:
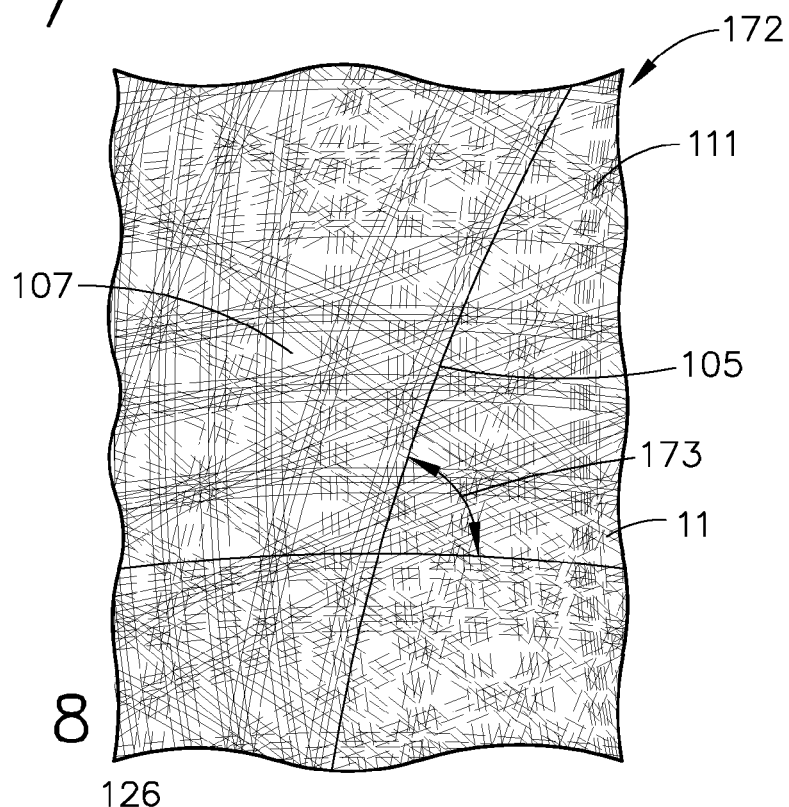
FIG. 8 is a diagrammatical perspective view illustration of a second surface pattern of a composite braided material suitable for the plies illustrated in FIGS. 4-6.
Figure 9:
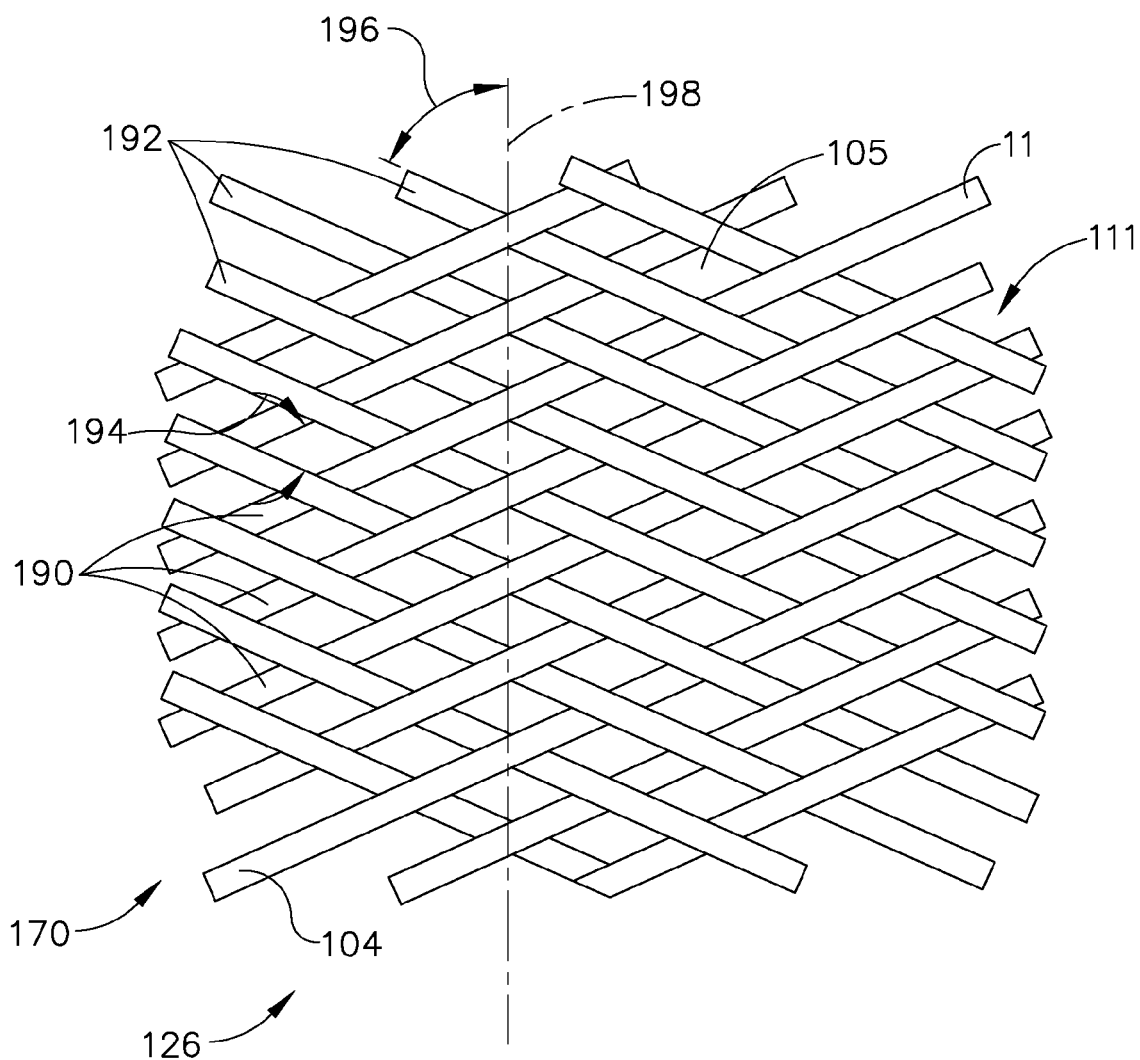
FIG. 9 is a diagrammatical perspective view illustration of a third surface pattern of a composite layed up material suitable for the plies illustrated in FIGS. 4-6.

Portions of an exemplary plies 11 are illustrated in FIGS. 7-9 to illustrate various patterns and arrangements of tows 104 in the ply surface patterns 126 which are in part defined by the tows 104. Ply surface recesses 105 in the ply surface patterns 126 and the plies 11 are defined between the tows 104. Thus, the plies 11 have ply surface patterns 126 on ply pressure and suction sides 111, 113 of the plies 11 that include the ply surface recesses 105 or ply surface spaces 107 between the tows 104.

A stacked unidirectional woven ply 160 is illustrated in FIG. 7 as having the ply surface recesses 105 or the ply surface spaces 107 between the tows 104. The tows 104 in FIG. 7 are all parallel across the composite airfoil 72. The ply surface pattern 126 may be described as corrugated with the tows 104 defining peaks 162 and the ply surface recesses 105 or the ply surface spaces 107 defining troughs 164 therebetween.

An off-angle tow layup 172 is illustrated in FIG. 8 in which the tows 104 are layed up tows 104, having been layed up by hand or preferably by a tow laying or layup machine. The ply surface recesses 105 or the ply surface spaces 107 are disposed between layed up tows 104 and some of the tows are layed up at layup angles 173 other than 90 degrees to other tows. The spar surface patterns 128 include spaced apart spar surface protrusions 144 with spar surface spaces 146 therebetween. The layed up tows 104 are layed up in the spar surface spaces 146.

A braided unidirectional woven ply 170 is illustrated in FIG. 9 as having the ply surface recesses 105 or the ply surface spaces 107 between braided tows 104. The composite airfoil 72 represented by the tows 104 in FIG. 9 includes first and second groups 190, 192 of the tows 104. The tows 104 in the first group 190 are arranged at a first angle 194 to the tows 104 in the second group 192 and at a second angle 196 with respect to a tab or shank centerline 198 in a criss-cross pattern.

Figure 15:
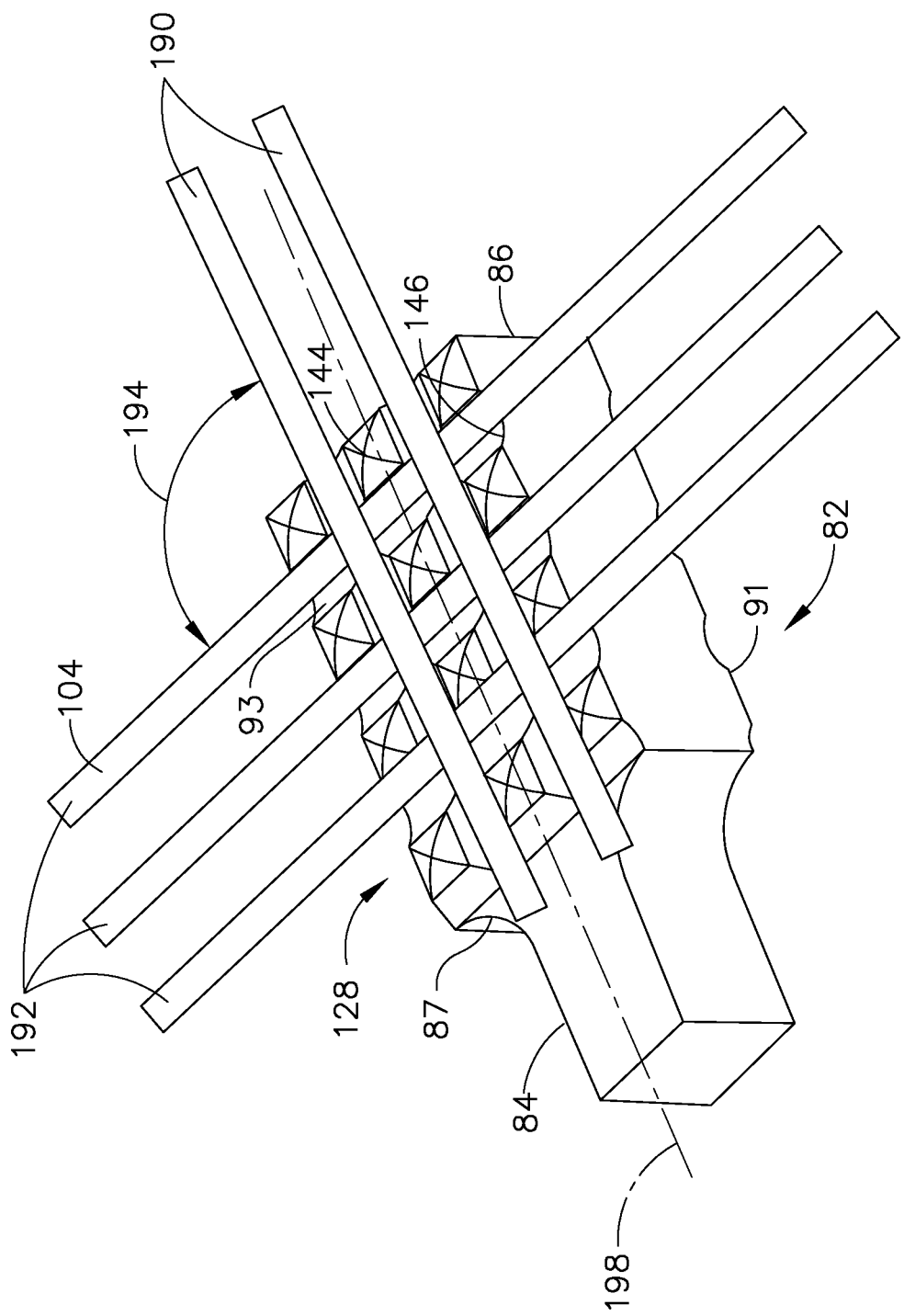
FIG. 15 is a diagrammatical perspective view illustration of the metallic shank and tab with tows from the third composite ply pattern disposed in the third surface pattern illustrated in FIG. 12

The composite airfoil 72 represented by the tows 104 in FIG. 15 includes first and second groups 190, 192 in which the tows 104 in the first group 190 are arranged at a first angle 194 to the tows 104 in the second group 192 and are parallel to the shank centerline 198 in a criss-cross pattern. The first angle 194 in FIG. 9 is illustrated as 90 degrees.

Figure 10:
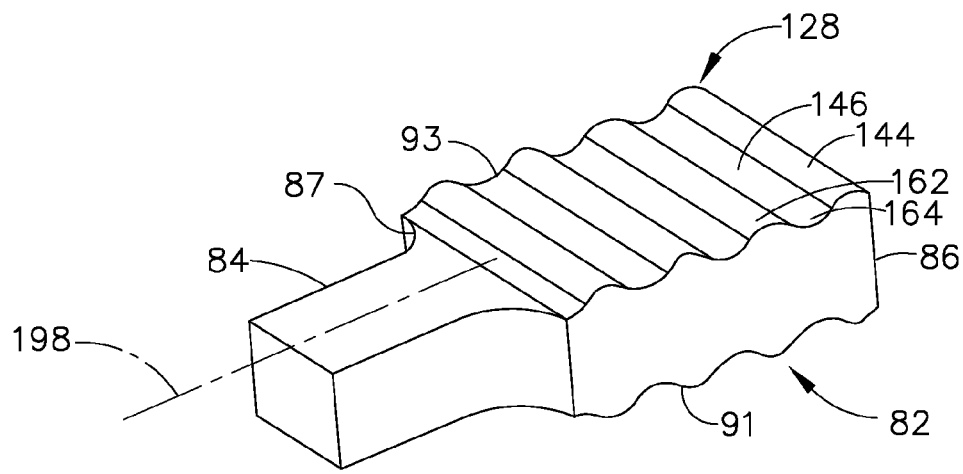
FIG. 10 is a diagrammatical perspective view illustration of the metallic shank and tab with a first surface spar pattern matched to a first surface composite ply pattern of a composite airfoil illustrated in FIG. 7.
Figure 11:
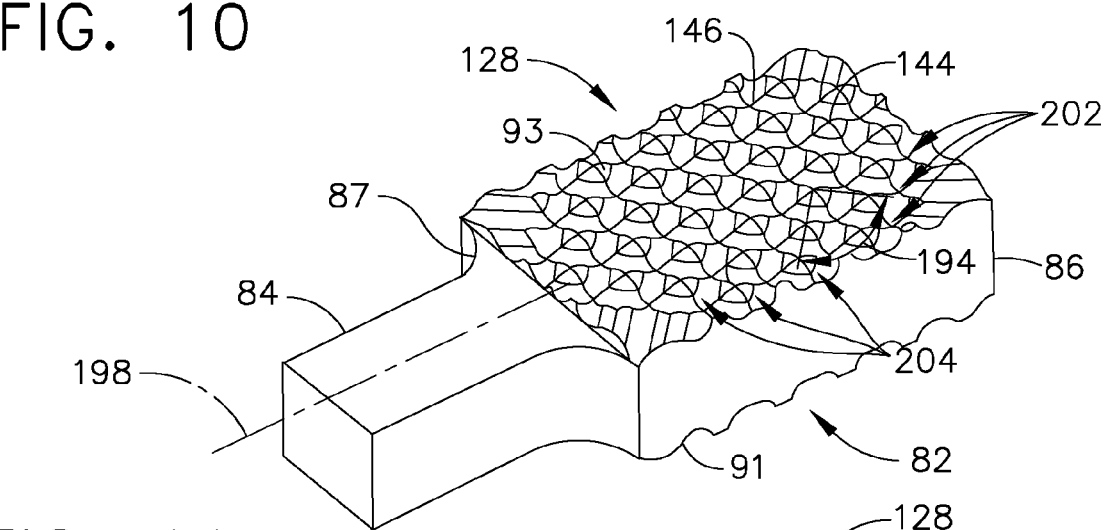
FIG. 11 is a diagrammatical perspective view illustration of the metallic shank and tab with a second surface spar pattern matched to a second surface composite ply pattern of a composite airfoil illustrated in FIG. 8.
Figure 12:
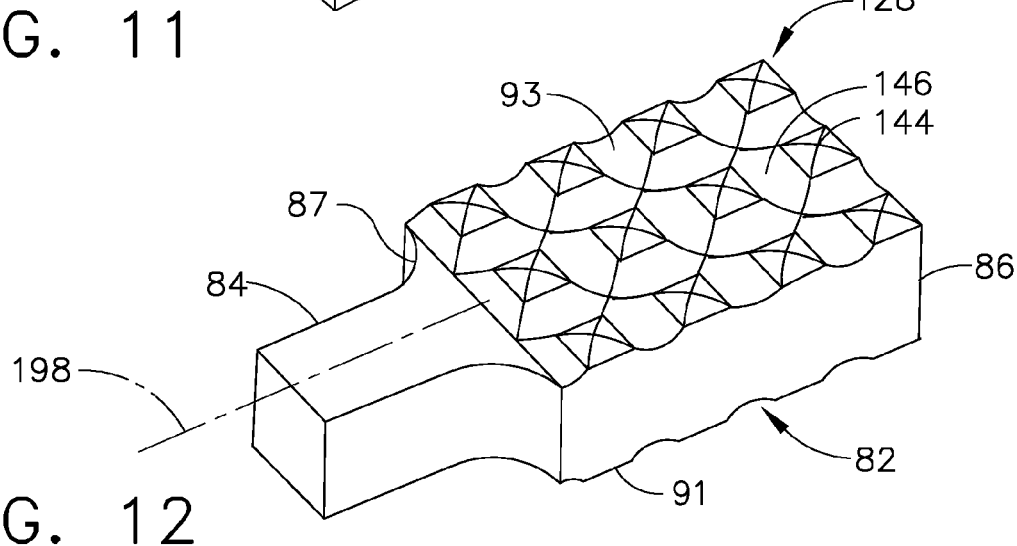
FIG. 12 is a diagrammatical perspective view illustration of the metallic shank and tab with a third surface spar pattern matched to a second surface composite ply pattern of a composite airfoil illustrated in FIG. 9.
Figure 14:
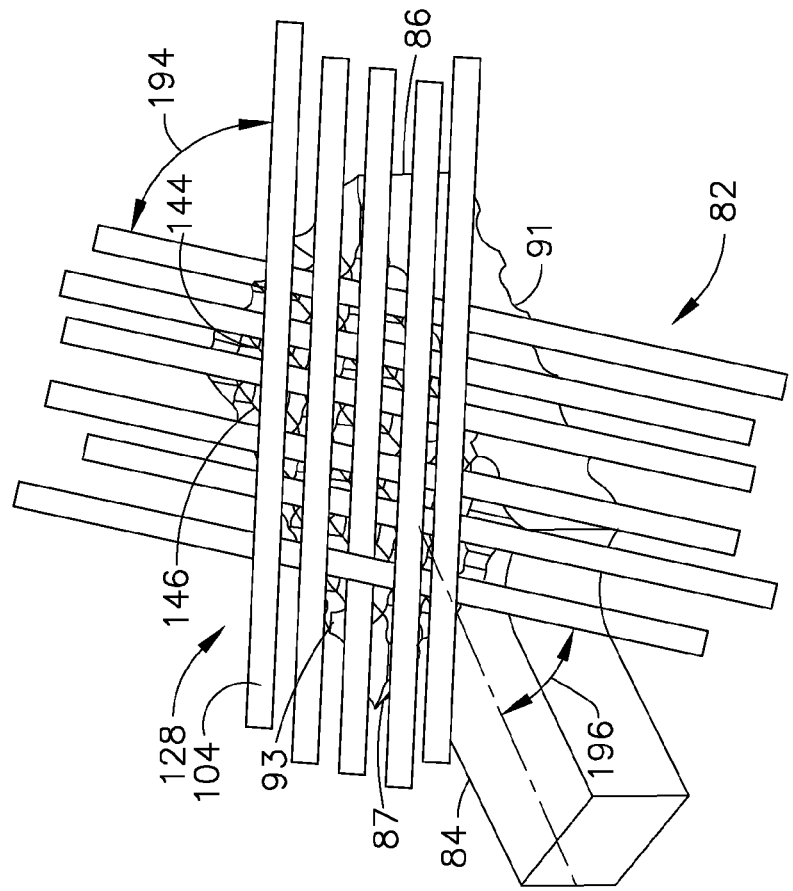
FIG. 14 is a diagrammatical perspective view illustration of the metallic shank and tab with tows from the second composite ply pattern disposed in the second surface pattern illustrated in FIG. 11.
Figure 13:
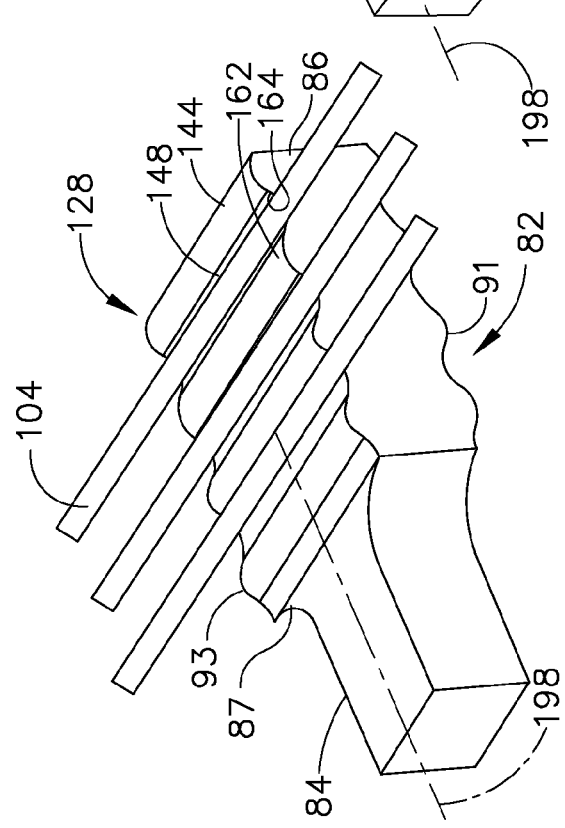
FIG. 13 is a diagrammatical perspective view illustration of the metallic shank and tab with tows from the first composite ply pattern disposed in the first surface pattern illustrated in FIG. 10.

Illustrated in FIGS. 10-12 are spars 82 with exemplary spar surface patterns 128 to which the ply surface patterns 126 are designed to generally conform to and provide a mechanical lock between the two when the plies 11 are molded and cured around the spar 82 and tab 86. The tab 86 or the upper end 87 of the shank 84 of the spar 82 includes the spar surface pattern 128. The spar surface patterns 128 include spaced apart spar surface protrusions 144 with spar surface spaces 146 therebetween. The spar surface patterns 128 are designed so that the tows 104 are at least partially received or disposed within the spar surface spaces 146 between the spar surface protrusions 144 as illustrated in FIGS. 13-15. Conversely, the spar surface protrusions 144 extend outwardly from the spar 82 and are disposed between the tows 104.

The spar surface pattern 128 illustrated in FIG. 10 is corrugated or wavy and includes continuous spar surface protrusions 144 and continuous spar surface spaces 146 therebetween. This corrugated spar surface pattern 128 defines spar peaks 162 and troughs 164 designed to conform to the ply peaks 162 and troughs 164 of the ply surface pattern 126 illustrated in FIG. 7. The peaks 162 are illustrated as being rounded but may be sharper and characterized as teeth. In this spar surface pattern 128, the peaks 162 correspond to the spaced apart spar surface protrusions 144 and the troughs 164 correspond to the spar surface spaces 146.

The spar surface pattern 128 illustrated in FIG. 11 corresponds and conforms to the braided unidirectional woven ply pattern illustrated in FIG. 9 and includes segmented spar surface protrusions 144 and segmented spar surface spaces 146 therebetween. This spar surface pattern 128 includes first and second rows 202, 204 of the segmented spar surface protrusions 144 and the segmented spar surface spaces 146. The first and second rows 202, 204 are angled with respect to each other at a first angle 194. The first angle 194 may be 90 degrees as illustrated in FIG. 12. The first rows 202 may be angled at a second angle 196 with respect to a tab or shank centerline 198 in a criss-cross pattern as illustrated in FIGS. 11 and 14.

FIGS. 13-15 illustrate the tows 104 directly or indirectly press against the spar 82 and are disposed within the spar surface spaces 146 and between the spar surface protrusions 144. The tows 104 directly or indirectly press against the spar 82 along the tab pressure and suction sides 91, 93 of the tab 86. The tows 104 indirectly press against the tab 86 by pressing against cured or hardened resin 148 between the tows 104 and along the spar surface spaces 146 on the tab 86 or shank 84. This provides mechanical locking of the composite airfoil 72 to the tab 86 or the shank 84.

The tows 104 are individual composite fiber bundles which are intermixed into the geometric configuration of the spar surface protrusions 144 in the spar surface pattern 128 illustrated in FIGS. 10-12. The individual tows 104 are typically 1/8 or 1/4 inch in width and 0.005-0.008 inches high. Each tow is unidirectional and therefore, as you lay down the tow, it can be fit into the geometric spar surface spaces 146 on the tab 86 or shank 84.

Figure 2:
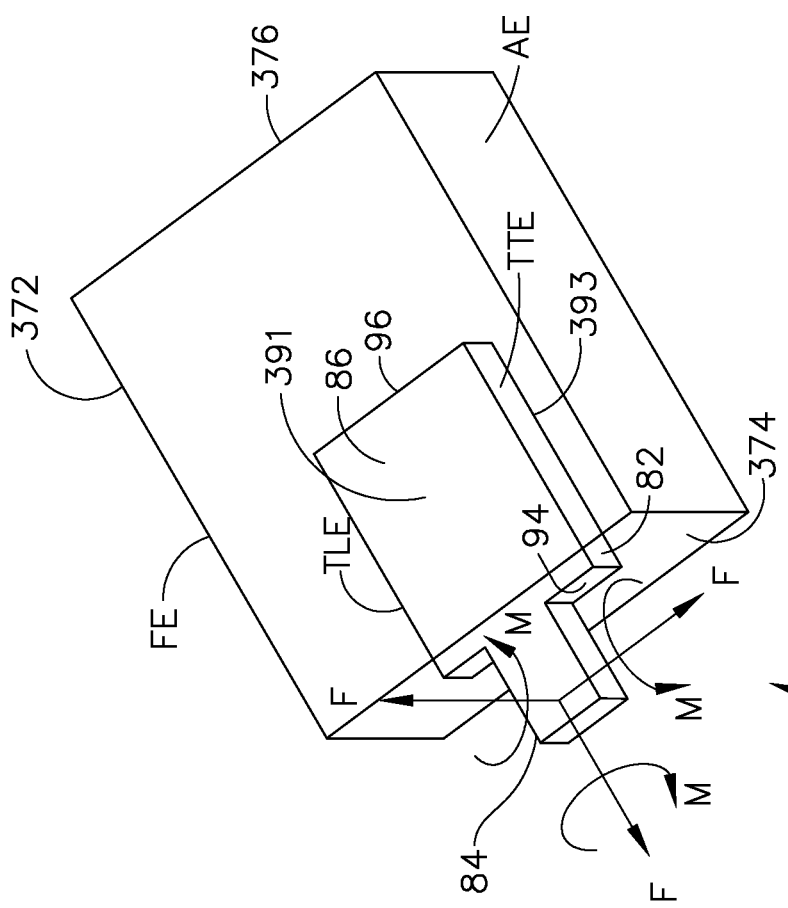
FIG. 2 is a diagrammatical perspective view illustration of a composite article having a metallic shank with an enlarged tab inserted in a composite element of the article.

Illustrated in FIG. 2 is a more general composite article 370 including a composite component 372 extending heightwise from an component base 374 to an component tip 376 and lengthwise between spaced apart component first and second edges LE, TE. The composite component 372 is made up of filament reinforced laminations 100 formed from a composite material lay-up 106 of filament reinforced composite plies 11 as those described above and illustrated in FIGS. 7-9. The composite component 372 is mounted on a spar 82 including a shank 84 extending from below the component base 374 up through the component base 374 into the composite component 372.

The exemplary spar 82 illustrated herein includes a tab 86 at an upper end 87 of shank 84. The tab 86 is either substantially or fully embedded in the composite component 372 and may be substantially wider than the shank 84 in a generally lengthwise direction between forward and aft edges FE, AE of the composite component 372. The tab 86 includes widthwise spaced apart tab first and second sides 391, 393 extending outwardly from a tab base 94 to a tab tip 96 and lengthwise between spaced apart tab first and second leading and trailing edges TLE, TTE. The tab first and second sides 391, 393 correspond to the ply first and second sides 111, 113. The spar 82, as disclosed above, is made of a material substantially harder than that of the component 372. The spar material may be metallic. Exemplary spar surface patterns 128 to which the ply surface patterns 126 are designed to generally conform and provide a mechanical lock between the two when the plies 11 are molded and cured around the spar 82 and tab 86.

Ply edges 114 of the plies 11 have some of the composite airfoil 72 directly or indirectly presses against the tab 86 to help mechanically secure the composite airfoil to the tab 86. The ply edges 114 indirectly presses against the tab 86 by pressing against cured or hardened resin between the ply edge 114 and the tab 86. A first portion 136 of the plies 11 terminate at the tab 86 along the tab 86 and more particularly along one or both of the leading and trailing edges TLE, TTE of the tab 86. A second portion 138 of the plies 11 have ply edges 114 that directly or indirectly press against the tab 86 and the tab tip 96 as illustrated in FIGS. 5 and 6.

The tab 86 may also be shaped to provide mechanical locking of the composite airfoil 72 to the tab 86 such as the tapered tab 86 illustrated in FIG. 6.

Illustrated in FIG. 6 is the widthwise tab 86 tapered having curved tab pressure and suction sides 91, 93. The tab 86 also has indented and lengthwise or widthwise inwardly curved surfaces 140, 142 extending between the tab base 94 and the tab tip 96 and between the tab leading and trailing edges TLE, TTE. The lengthwise and widthwise inwardly curved surfaces 140, 142 are along the tab pressure and suction sides 91, 93 and are inwardly indented into the tab 86 and away from widthwise spaced apart airfoil pressure and suction sides 71, 73 respectively of the composite airfoil 72. The tab 86 tapers widthwise inwardly from the tab tip 96 to the tab base 94 as defined by lengthwise and widthwise inwardly curved surfaces 140, 142. The lengthwise and widthwise inwardly curved surfaces 140, 142 define pressure and suction side indentations 150, 152 in the tab 86.

The present invention has been described in an illustrative manner. It is to be understood that the terminology which has been used is intended to be in the nature of words of description rather than of limitation. While there have been described herein, what are considered to be preferred and exemplary embodiments of the present invention, other modifications of the invention shall be apparent to those skilled in the art from the teachings herein and, it is, therefore, desired to be secured in the appended claims all such modifications as fall within the true spirit and scope of the invention.

Accordingly, what is desired to be secured by Letters Patent of the United States is the invention as defined and differentiated in the following claims:

What is claimed is:

1. A composite article comprising:
   a composite component extending heightwise from a component base to a component tip and lengthwise between spaced apart component first and second edges,
   the composite component including plies having widthwise spaced apart ply first and second sides and ply edges therebetween,
   the composite component mounted on a spar including a shank extending heightwise from below the component base up through the component base into the composite component,
   a tab at an upper end of shank and substantially or fully embedded in the composite component,
   the tab including heightwise spaced apart tab base and tab tip, and
   at least one ply surface pattern of the composite component contacting and generally conforming to at least one spar surface pattern on the tab.

2. The composite article as claimed in claim 1 further comprising the spar surface pattern including spaced apart spar surface protrusions with spar surface spaces therebetween and the spar surface protrusions extending outwardly from the spar and being disposed between tows in the ply surface pattern.

3. The composite article as claimed in claim 2 further comprising the tows being layed up tows in the spar surface spaces.

4. The composite article as claimed in claim 1 further comprising:
   the spar surface pattern including spaced apart spar surface protrusions with spar surface spaces therebetween,
   tows in the ply surface pattern,
   ply surface recesses in between the tows in the ply surface pattern, and
   the tows disposed in the spar surface spaces and between the spar surface protrusions.

5. The composite article as claimed in claim 4 further comprising:
   the spar surface pattern being corrugated or wavy,
   the spar surface spaces and the spar surface protrusions being continuous,
   the spaced apart spar surface protrusions defining spar peaks,
   the spar surface spaces defining spar troughs, and
   the tows disposed in the spar troughs and between the spar peaks.

6. The composite article as claimed in claim 4 further comprising:
the spar surface spaces and the spar surface protrusions being segmented,
first and second rows of the segmented spar surface protrusions and the segmented spar surface spaces,
the first rows of the segmented spar surface protrusions angled with respect to the second rows of the segmented spar surface protrusions at a first angle,
the first rows of the segmented spar surface spaces angled with respect to the second rows of the segmented spar surface spaces at the first angle, and
first and second groups of the tows disposed in the first and second rows of the segmented spar surface spaces respectively.

7. The composite article as claimed in claim 6 further comprising the first angle being 90 degrees.

8. The composite article as claimed in claim 6 further comprising the first rows of the segmented spar surface protrusions angled with respect to a tab or shank centerline of the spar.

9. A composite blade or vane comprising:
a composite airfoil including widthwise spaced apart airfoil pressure and suction sides extending heightwise or spanwise and outwardly from an airfoil base to an airfoil tip and lengthwise or chordwise between spaced apart airfoil leading and trailing edges,
the composite airfoil including plies having widthwise spaced apart ply pressure and suction sides and ply edges therebetween,
the composite airfoil mounted on a spar including a shank extending heightwise from below the airfoil base up through the airfoil base into the composite airfoil,
a tab at an upper end of shank and substantially or fully embedded in the composite airfoil,
the tab including spanwise spaced apart tab base and tab tip, and
at least one ply surface pattern of the composite component contacting and generally conforming to at least one spar surface pattern on the tab.

10. The composite blade or vane as claimed in claim 9 further comprising:
the tab including widthwise spaced apart tab pressure and suction sides extending outwardly from the tab base to the tab tip,
the at least one spar surface pattern being on the tab pressure and suction sides, and
the at least one ply surface pattern of the composite component contacting and generally conforming to the at least one spar surface pattern on the tab pressure and suction sides.

11. The composite blade or vane as claimed in claim 10 further comprising the spar surface pattern including spaced apart spar surface protrusions with spar surface spaces therebetween and the spar surface protrusions extending outwardly from the spar and being disposed between tows in the ply surface pattern.

12. The composite blade or vane as claimed in claim 11 further comprising the tows being layed up tows in the spar surface spaces.

13. The composite blade or vane as claimed in claim 10 further comprising:
the spar surface pattern including spaced apart spar surface protrusions with spar surface spaces therebetween,
tows in the ply surface pattern,
ply surface recesses in between the tows in the ply surface pattern, and
the tows disposed in the spar surface spaces and between the spar surface protrusions.

14. The composite blade or vane as claimed in claim 13 further comprising:
the spar surface pattern being corrugated or wavy,
the spar surface spaces and the spar surface protrusions being continuous,
the spaced apart spar surface protrusions defining spar peaks,
the spar surface spaces defining spar troughs, and
the tows disposed in the spar troughs and between the spar peaks.

15. The composite blade or vane as claimed in claim 13 further comprising:
the spar surface spaces and the spar surface protrusions being segmented,
first and second rows of the segmented spar surface protrusions and the segmented spar surface spaces,
the first rows of the segmented spar surface protrusions angled with respect to the second rows of the segmented spar surface protrusions at a first angle,
the first rows of the segmented spar surface spaces angled with respect to the second rows of the segmented spar surface spaces at the first angle, and
first and second groups of the tows disposed in the first and second rows of the segmented spar surface spaces respectively.

16. The composite blade or vane as claimed in claim 15 further comprising the first angle being 90 degrees.

17. The composite blade or vane as claimed in claim 15 further comprising the first rows of the segmented spar surface protrusions angled with respect to a tab or shank centerline of the spar.

18. The composite blade or vane as claimed in claim 13 further comprising a widthwise taper between the tab base and the tab tip.

19. The composite blade or vane as claimed in claim 18 further comprising the widthwise taper tapering down in thickness from the tab tip towards the tab base.

20. The composite blade or vane as claimed in claim 19 further comprising the ply edges of at least a portion of the plies directly or indirectly contacting or pressing against the tab tip.

* * * * *